United States Patent [19]

Peterson

[11] 4,393,601
[45] Jul. 19, 1983

[54] MEASURING DEVICE

[76] Inventor: Jerald G. Peterson, 1417 Kurtz Rd., McLean, Va. 22101

[21] Appl. No.: 314,865

[22] Filed: Oct. 26, 1981

[51] Int. Cl.³ .............................................. G01B 3/02
[52] U.S. Cl. ........................................ 33/494; 33/476; 83/761
[58] Field of Search ................. 33/494, 411, 417, 476, 33/197, DIG. 9, 174 G; 83/746, 761; 144/91, 216, 217, 253 G

[56] References Cited

U.S. PATENT DOCUMENTS

| 563,465 | 7/1896 | Farley | 33/476 |
| 809,950 | 1/1906 | Heysinger et al. | 33/494 |
| 821,959 | 5/1906 | Oxnam | 83/761 |
| 3,073,364 | 1/1963 | Jones | 144/216 |
| 3,878,615 | 4/1975 | Peterson | 33/DIG. 9 |

Primary Examiner—Willis Little
Attorney, Agent, or Firm—Witherspoon & Hargest

[57] ABSTRACT

A measuring device for measuring a length of picture frame material which device includes a plurality of elongated stepped surfaces at least two of which are substantially parallel and offset relative to each other. At least two reference marks are provided to allow determination of the cutting length of the inside or rabbet side edge of the framing material.

6 Claims, 5 Drawing Figures

MEASURING DEVICE

BACKGROUND OF THE INVENTION

The invention is directed to a measuring device for measuring the length of framing material to be cut for use in the production of a picture frame. One of the problems incurred in the production of a picture frame is the difficulty involved in cutting the framing material in such a manner to assure that the inner dimension of the frame will adequately accommodate the picture or mat to be framed. This problem results from the fact that the sides of frames are usually cut such that the ends thereof are inclined at an angle of 45° so that when the four sides are assembled the corners of the completed frame are 90° and the completed frame is in the shape of a square or rectangle. In making such an angular cut, it is difficult to know where to align the cutting or saw blade to assure that the inner dimension of the finished frame is adequate. This is particularly difficult when the framing material has a rabbet cut in one edge since in such instances it is difficult, if possible at all, to see the rabbet portion of the molding material when cutting the ends at an angle of 45°.

One prior art manner of measuring the proper inside dimension of each side of framing material involves an equation the solution of which allows for the marking of the inside edge of the molding material to identify where the material must be cut. The equation involves ascertaining the length of the edge of the picture to be associated with the particular piece of framing material to be cut and subtracting from such length an amount equal to two times the depth of the rabbet. The resulting dimension allows for the marking of the points along the inside edge of the molding at each end thereof where the 45° cuts are to be made. For example, if a piece of framing material is to be cut to accommodate a picture edge which measures 10 inches and the depth of the rabbet cut into the molding material is ¼ inch, then the inside edge of the molding should be visibly marked for cutting at a length of 9½ inches, as noted below:

Picture Edge Length: 10 inches
Rabbet Depth: ¼ inch
2×Rabbet Depth: ½ inch
Inside Cutting Marks: 10−½=9½ inches Usually, an additional ⅛ inch is added to assure proper fitting of the picture or mat material when the frame is assembled. Obviously, the use of such an equation is time consuming and susceptible to error. Further, in addition to measuring the picture or mat, the depth of the rabbet must also be measured.

Another problem incurred in measuring picture frame material is that waste occurs when only the inner or rabbet edge of the material can be marked for cutting. In such instances, failure to also mark the outer edge makes it difficult to know exactly where one piece or side of frame material ends and the next begins.

Accordingly, it is an object of this invention to provide a measuring device to measure a length of picture frame material which device does not require the use of an equation.

Another object of this invention is to provide a measuring device to measure a length of picture frame material which device may be used independent of the depth of a rabbet cut into such material.

Still another object of this invention is to provide a measuring device to measure a length of picture frame material which allows for the proper length of material to be measured in a single step and in an expedient and error free manner.

A further object of this invention is to provide a measuring device to measure a length of picture frame material which device does not comprise a complex mechanism.

Still a further object of this invention is to provide a measuring device to measure a length of picture frame material the use of which reduces waste of frame material by allowing the marking of the inside and outside edge of each piece of framing material to be cut so that it is possible to identify where one piece ends and the next begins.

SUMMARY OF THE INVENTION

This invention achieves these and other objects by providing a measuring device for measuring a length of picture frame material which device comprises a plurality of stepped surfaces including a first surface extending in a first longitudinal plane and a second surface extending in a second longitudinal plane. The first and second surfaces are substantially parallel and offset relative to each other to form the stepped surfaces. A third surface is provided which extends from the first surface to the second surface in a third plane. Such third surface extends substantially at right angles to the first and second surfaces. A first reference mark is positioned upon at least one of the surfaces, and at least one second reference mark, spaced from the first reference mark, is positioned upon at least one of the first and second surfaces at a predetermined angle relative to the third surface. In one embodiment, the measuring device includes a plurality of such second reference marks each of which comprises a line, such lines being spaced and parallel to each other. Preferably at least one of such lines intercepts the first reference mark. Also preferably, the measuring device also includes a reference line which extends along at least one of the first and second surfaces from the first reference mark and at an angle of 90° relative to such spaced lines which form such plurality of second reference marks. In such embodiment, the first reference mark extends into a real or imaginery line which is perpendicular to the first and second surfaces and is in the third plane. If desired, the reference line and the parallel lines may extend along the first surface from the third surface and be continued along the second surface from the third surface. In any of the embodiments of this invention, the preferred predetermined angle is 135°.

DESCRIPTION OF THE DRAWINGS

This invention may be clearly understood by reference to the attached drawings in which.

DESCRIPTION OF PREFERRED EMBODIMENT

Figure 1:
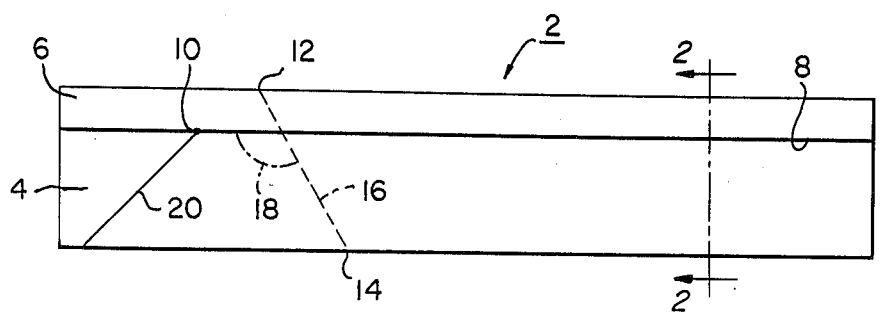
FIG. 1 is a plan view of one embodiment of the present invention.
Figure 2:
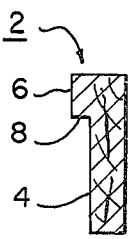
FIG. 2 is a side view of the embodiment depicted in FIG. 1.
Figure 3:
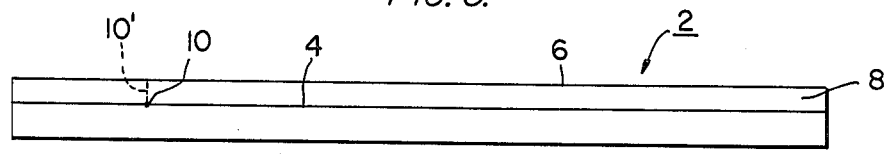
FIG. 3 is a front view of the embodiment depicted in FIG. 1.

The embodiment of this invention which is depicted in the drawings is one which is particularly suited for achieving the objects of this invention. In the drawings, like reference numerals identify like parts. FIGS. 1 through 3 depict a measuring device 2 comprising a plurality of stepped surfaces including a first surface 4 extending in a first longitudinal plane and a second surface 6 extending in a second longitudinal plane. As depicted in FIG. 2, surfaces 4 and 6 are substantially parallel and offset relative to each other to form stepped surfaces. A third surface 8 extends from surface 4 to surface 6 in a third plane. As depicted in FIG. 2, surface 8 extends substantially at right angles to surfaces 4 and 6. A first reference mark is positioned upon at least one of the surfaces 4, 6, 8, and for purposes of illustration such a first reference mark 10 is provided at surface 8 where surface 8 intercepts surface 4. A second reference mark is provided by points 12, 14 which define at least one imaginary line 16 which is spaced from reference mark 10. Line 16 is positioned upon at least one of the surfaces 4, 6 at a predetermined angle 18, relative to surface 8. Such predetermined angle is preferably equal to 135°. Line 16 is shown as a phantom line in FIG. 1 to demonstrate that markings 12, 14 may define an imaginery line used to mark a cutting line upon a workpiece during use as described hereinafter. Alternatively, measuring device 2 may include a real line 16 which has been marked upon surface 4 or surface 6, or surfaces 4 and 6, of the measuring device 2, in which case the reference mark 12, 14 will form a part of such scribed line 16. In such an embodiment, the scribed line or lines may be used to mark a cutting line upon a workpiece during use as described hereinafter.

Figure 4:
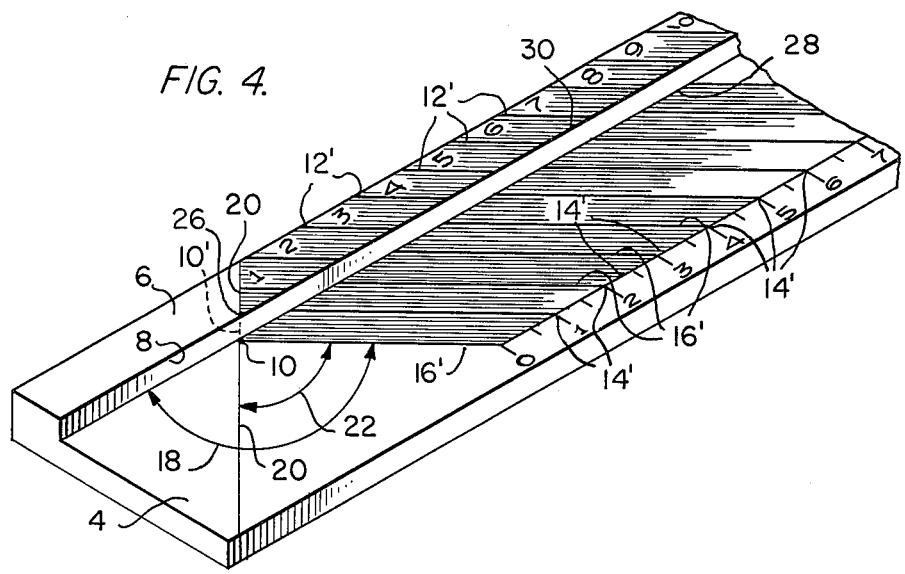
FIG. 4 is a perspective view of another embodiment of the present invention.
Figure 5:
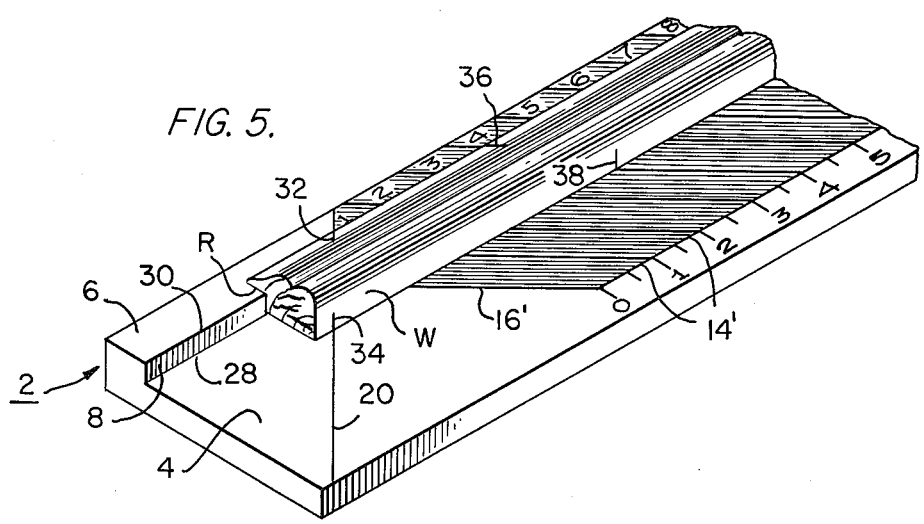
FIG. 5 is the embodiment of FIG. 4 in use.

As will be apparent to those skilled in the art, reference mark 10 forms a point of reference from which measurements may be made as noted hereinafter. Therefore, although reference mark 10 is depicted in FIGS. 1 to 3 as a point on surface 8 where surface 8 intercepts surface 4, reference mark 10 may also extend into a real or imaginery line reference mark 10' which is perpendicular to surfaces 4 and 6 and is in the plane in which base 8 extends. In making measurements, the desired point of reference may be positioned anywhere along line 10' or may be identified by line 10' in its entirety, depending upon the particular embodiment. In the embodiment of FIGS. 4 and 5, reference mark 10 extends into such line 10'.

In the embodiment depicted in FIGS. 4 and 5, a plurality of second reference marks 12', 14' define a plurality of lines 16' which are spaced parallel to each other. Such lines have been scribed upon the measuring device 2 so that marking 12' and 14' forms a part of and is incorporated into such real lines 16'. As shown in FIG. 4, at least one of the parallel lines 16' intercepts line 10' at reference mark 10.

Measuring device 2 may also include a reference line 20 which extends along at least one of the surfaces 4, 6 from reference mark 10 and at an angle of 90° relative to the spaced lines 16'. Such 90° angle is designated 22 in FIG. 4. In such a configuration, reference line 20 will extend at an angle of 45° relative to third surface 8. As depicted in the drawings, reference line 20 extends along surface 4 from line 10' where line 10' intercepts the base portion 28 at reference mark 10. Line 20 is continued along surface 6 from line 10' where line 10' intercepts the edge portion 30 at point 26. In the embodiment depicted in FIG. 4 most of the parallel lines 16 also extend along surfaces 4 and 6 from base portion 28 and edge portion 30, respectively.

In operation, a work piece W in the form of an elongated picture frame material is placed upon the measuring device as depicted in FIG. 5. In particular, the framing material, which includes a cutout portion or rabbet R, is positioned upon the measuring device 2 such that the surfaces which define the rabbet are adjacent or flush with the stepped surfaces 4, 6 and intermediate surface 8. Assuming that the picture to be framed includes at least one side the length of which is equal to 4 inches, then the framing material is marked where it intercepts reference line 20 and the reference mark 16 designated by the 4 inch reference notation. In other words, the framing material is marked at 32, 34, 36 and 38. By subsequently positioning the framing material in a miter box a saw blade can be aligned first with points 32, 34 and then with points 36, 38 so that a side of framing may be cut which will accommodate the side of the pictures to be framed which measures 4 inches.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

What is claimed is:

1. A measuring device comprising a plurality of stepped surfaces including a first surface extending in a first longitudinal plane and a second surface extending in a second longitudinal plane, said first and second surfaces being substantially parallel and offset relative to each other to form said stepped surfaces,
   a third surface extending from said first surface to said second surface in a third plane, said third surface extending substantially at right angles to said first and second surfaces,
   a first reference mark positioned upon at least one of said surfaces at a position where the plane of said third surface intersects said first and second surfaces, and
   at least one second reference mark comprising a plurality of marks which define at least one line which is spaced from said first reference mark and positioned upon at least one of said first and second surfaces at an angle of 135° relative to said third surface.

2. A measuring device comprising a plurality of stepped surfaces including a first surface extending in a first longitudinal plane and a second surface extending in a second longitudinal plane, said first and second surfaces being substantially parallel and offset relative to each other to form said stepped surfaces,
   a third surface extending from said first surface to said second surface in a third plane, said third surface extending substantially at right angles to said first and second surfaces,
   a first reference mark positioned upon at least one of said surfaces,
   a plurality of second reference marks each of which defines a line spaced from said first reference mark and positioned upon at least one of said first and second surfaces at a predetermined angle relative to said third surface, said lines being spaced and parallel to each other, and at least one of said lines intercepting said first reference mark, and
   a reference line, said reference line extending along at least one of said first and second surfaces from said first reference mark and at an angle of 90° relative to said spaced lines, said first reference mark extending into a line which is perpendicular to said first and second surfaces and is in said third plane.

3. The measuring device of claim 2 wherein said reference line and said parallel lines extend along said first surface from said third surface and are continued along said second surface from said third surface.

4. A measuring device comprising a plurality of stepped surfaces including a first surface extending in a first longitudinal plane and a second surface extending in a second longitudinal plane, said first and second surfaces being substantially parallel and offset relative to each other to form said stepped surfaces, a third surface extending from said first surface to said second surface in a third plane, said third surface extending substantially at right angles to said first and second surfaces, said third surface intersecting said first surface at a base portion and intersecting said second surface at an edge portion, a reference line extending along said first surface from a point at said base portion, said line extending at an angle of 45° relative to said third surface, said reference line also extending from said edge portion along said second surface, a first reference marking extending along said first surface from said point, said first reference mark extending at an angle of 90° relative to said reference line, and a plurality of spaced additional reference marks parallel to said first reference mark and to each other, each of said additional reference marks extending along said first surface from said base portion and also extending from said edge portion along said second surface.

5. A measuring device comprising a plurality of stepped surfaces including a first surface extending in a first longitudinal plane and a second surface extending in a second longitudinal plane, said first and second surfaces being substantially parallel and offset relative to each other to form said stepped surfaces, a third surface extending from said first surface to said second surface in a third plane, said third surface extending substantially at right angles to said first and second surfaces, a first reference mark positioned upon at least one of said surfaces, a plurality of second reference marks each of which defines a line spaced from said first reference mark and positioned upon at least one of said first and second surfaces at a predetermined angle relative to said third surface, said lines being spaced and parallel to each other, and a reference line, said reference line extending along at least one of said first and second surfaces from said first reference mark and at an angle of 90° relative to said spaced lines, said first reference mark extending into a line which is perpendicular to said first and second surfaces and is in said third plane.

6. The measuring device of claims 3, 5 or 2 wherein said predetermined angle is 135°.

* * * * *